United States Patent
Nikonov et al.

(10) Patent No.: US 7,059,782 B2
(45) Date of Patent: Jun. 13, 2006

(54) SUPPRESSING BACK REFLECTION BETWEEN OPTICAL INTERFACES

(75) Inventors: Dmitri Nikonov, San Jose, CA (US); Jun Su, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 10/121,384

(22) Filed: Apr. 12, 2002

(65) Prior Publication Data

US 2003/0194178 A1 Oct. 16, 2003

(51) Int. Cl.
*G02B 6/255* (2006.01)

(52) U.S. Cl. .......................... 385/98; 385/43; 385/50; 385/97

(58) Field of Classification Search .................. 385/31, 385/39, 43, 50, 95, 97, 98

See application file for complete search history.

(56) References Cited

U.S. PATENT DOCUMENTS

| 3,874,783 | A | * | 4/1975 | Cole ........................ 385/115 |
| 4,094,579 | A | * | 6/1978 | McMahon et al. ............ 385/49 |
| 4,790,616 | A | * | 12/1988 | Frenkel et al. ................. 385/47 |
| 5,650,123 | A | * | 7/1997 | Saini et al. .............. 422/82.11 |
| 5,787,214 | A | * | 7/1998 | Harpin et al. .................. 385/49 |
| 6,587,273 | B1 | * | 7/2003 | Xue et al. ..................... 359/618 |
| 6,775,441 | B1 | * | 8/2004 | Kikuchi et al. ................ 385/50 |

FOREIGN PATENT DOCUMENTS

JP  05188239  A  *  7/1993

* cited by examiner

*Primary Examiner*—Akm Enayet Ullah
*Assistant Examiner*—Daniel Petkovsek
(74) *Attorney, Agent, or Firm*—Trop, Pruner & Hu, P.C.

(57) ABSTRACT

An optical element, such as a waveguide or fiber ribbon, may be formed with an edge surface that reduces back reflections when light travels between optical elements butted against one another. Instead of cutting the surface at an oblique angle to the plane of the element, the surface may be cut transversely to this plane but at an angle to the optical axis, in order to facilitate the fabrication of an appropriately inclined optical interface.

4 Claims, 1 Drawing Sheet

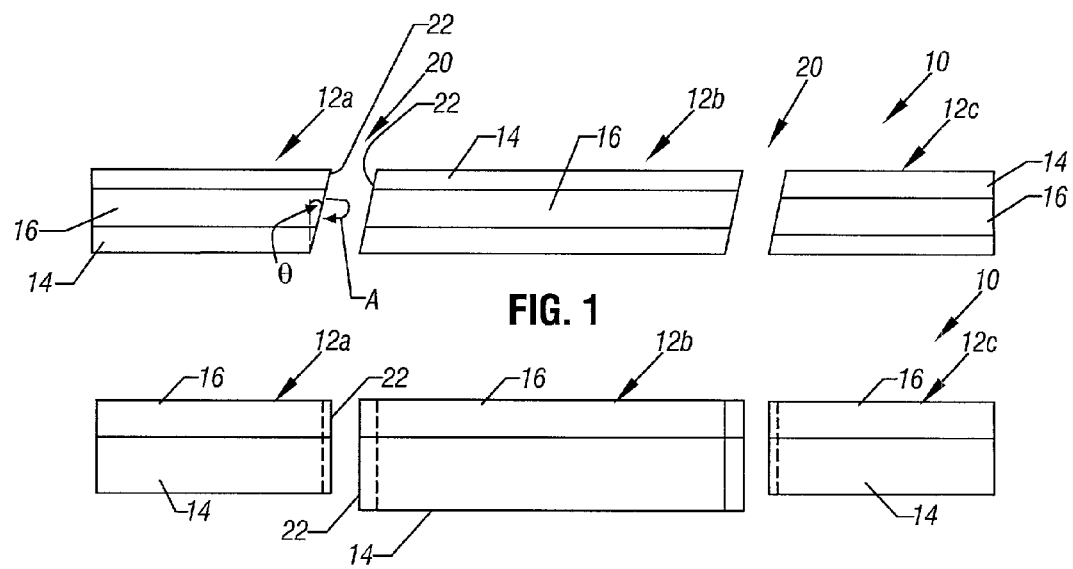
FIG. 1
FIG. 2
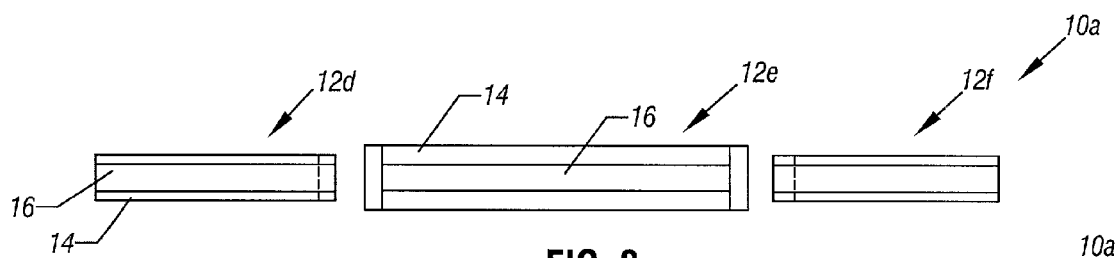
FIG. 3
(PRIOR ART)
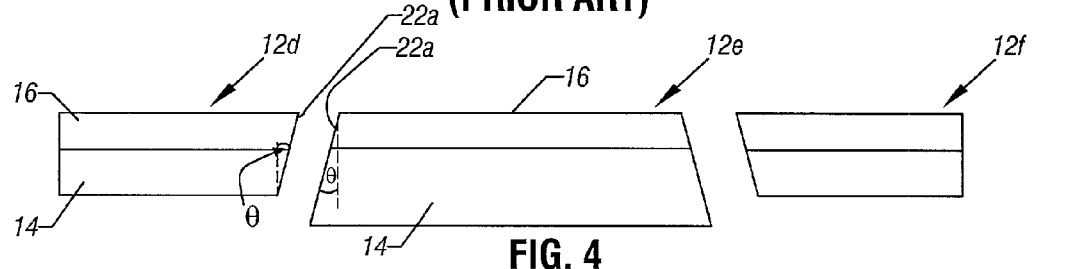
FIG. 4
(PRIOR ART)

SUPPRESSING BACK REFLECTION BETWEEN OPTICAL INTERFACES

BACKGROUND

This invention relates generally to optical networks, and particularly to systems that have a plurality of optical components with interfaces between waveguides.

Waveguides are formed in solid substrates. One waveguide may be aligned with a second waveguide, such that their axes are nearly on the same straight line. Customarily, a face of each waveguide is polished at an oblique angle to the axis of the waveguide. As a result, light reflected from the interface with the second waveguide is not coupled back to the first waveguide.

Thus, in a variety of situations, there are interfaces between successive optical elements such as waveguides, fibers, and fiber ribbons. At each interface it is desirable to prevent back reflections.

The interfaces may be formed by a cut transverse of the length of an optical component to abut with an ensuing component. Thus, for example, an optical fiber ribbon may be cut transversely to its length to form a transverse edge that abuts with another optical component at an interface. In order to prevent back reflection by forming the oblique angle at the interface, the transversely severed edge is polished to form the desired angle that prevents back reflection. Thus, multiple operations are needed, increasing the cost of forming an appropriate reflection suppressing interface.

Therefore, there is need for better ways to form interfaces between optical elements.

BRIEF DESCRIPTION OF THE DRAWINGS

FIG. 1 is an exploded top plan view of one embodiment of the present invention;

FIG. 2 is an exploded side elevational view of the embodiment shown in FIG. 1;

FIG. 3 is an exploded top plan view in accordance with the prior art; and

FIG. 4 is an exploded side elevational view of the prior art.

DETAILED DESCRIPTION

Referring to FIG. 1, an optical system 10 may include a series of abutting optical elements 12a, 12b, and 12c (the gaps 20 between elements 12 being exploded in the figures). Light may be transmitted serially from one element 12 to the next element 12 in line. As a result, optical interfaces 20 are formed between successive, abutting optical elements 12. To prevent back reflections as indicated by the arrow A in FIG. 1, the surface 22 of mating elements 12 (such as the elements 12a and 12b) may be cut at an angle θ with respect to perpendicular to the axes or lengths of the abutting elements 12. The actual cut that forms the surface 22 may be made transversely to the plane of the substrate 14 of each optical element 12 but at an angle to the length of the element 12. In other words, the cut is made transversely to the plane of the substrate 14, while still creating a tapered surface on each optical element 12 by angling the perpendicular cut to the optical axes of the abutting elements 12.

As shown in FIG. 2, in one embodiment, a waveguide 16, such as fiber ribbon, may be positioned at the edge of a substrate 14. The surfaces 22 may be cut transversely to the upper surface of the waveguide 16 and transversely to the plane of the substrate 14, facilitating the formation of the cut. After the cut has been made at the angle θ, the resulting surface 22 may be polished.

In contrast, referring to FIG. 3, with the prior art, cuts are made at a non-perpendicular angle to the plane of the substrate 14 and the upper surface of the waveguide 16. As a result, back reflections are prevented, but an oblique cut must be made through the material. This oblique cut requires more complex manufacturing techniques, increasing the expense of the resulting process.

Thus, as shown in FIG. 4, an angled surface 22a is defined, but it was defined by a cut that extends at an oblique angle through each element 12. It is considerably easier to cut transversely to the plane of the optical element 12 and simply to do so at an angle relative to the length or optical axis of the optical element 12.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   severing a first optical element having an optical waveguide and cladding by cutting orthogonally to a horizontal surface supporting said first optical element and at a non-orthogonal angle to the length of the element;
   cutting a second optical element having a waveguide and cladding thereon by making a cut orthogonally to a horizontal surface supporting said second optical element and at a non-orthogonal angle to the length of said second optical element; and
   joining said optical elements end to end on their severed surfaces such that the optical waveguides are aligned substantially in a line.

2. The method of claim 1 including abutting said first and second optical elements each having a mating tapered end surface.

3. The method of claim 2 including arranging said tapered end surfaces parallel to one another.

4. The method of claim 1 including forming a substrate having an upper edge abutting said waveguide and a lower edge opposite said upper edge, said upper and lower edges being substantially the same length.

* * * * *